United States Patent [19]

Snodgrass

[11] Patent Number: 5,740,209

[45] Date of Patent: Apr. 14, 1998

[54] METHOD OF ADJUSTING FOR DOPPLER SHIFTS IN COMMUNICATION SIGNALS

[75] Inventor: Timothy E. Snodgrass, Palo, Iowa

[73] Assignee: Rockwell International, Costa Mesa, Calif.

[21] Appl. No.: 715,676

[22] Filed: Sep. 18, 1996

[51] Int. Cl.$^6$ .................. H04L 1/00; H04L 25/08
[52] U.S. Cl. .................. 375/346; 375/354; 370/509; 370/512
[58] Field of Search .................. 375/354, 359, 375/362, 363, 364, 365, 366, 367, 371, 346, 200–210; 370/503, 509, 512, 514, 516

[56] References Cited

U.S. PATENT DOCUMENTS 4,621,365  11/1986  Chiu ........................... 375/367

OTHER PUBLICATIONS

"Introduction To Electronic Defense Systems" by Filippo Neri, pp. 265–267, 1991, Norwood, MA.

Primary Examiner—Stephen Chin
Assistant Examiner—Hai H. Phan
Attorney, Agent, or Firm—Kyle Eppele

[57] ABSTRACT

A method of processing wireless signal of data pulses or packets in a communication system, in which a portion of the data pulses in an individual signal are utilized to determine a rate of time shift for eliminating or minimizing the effects of Doppler shift in the intra-data pulse processing. One embodiment of the invention provides a method of utilizing the time refinement section of a JTIDS waveform for the purpose of determining an intra-burst data correction factor based upon the average shift of the midpoint of the sampled time refinement section pulses.

18 Claims, 4 Drawing Sheets

METHOD OF ADJUSTING FOR DOPPLER SHIFTS IN COMMUNICATION SIGNALS

FIELD OF INVENTION

The present invention relates generally to digital communications, and more particularly is a method of solving data processing timing concerns with respect to high speed data transmissions and most particularly with Doppler shift effects on high speed data transmitted via the JTIDS waveform.

BACKGROUND OF THE INVENTION

Communication systems are facing a wide variety of system integrity challenges in today's ever advancing electronic world. The rapidly increasing use of wireless communication systems, often co-located with complementary wireless systems, provides increased opportunity for signal corruption between intended users. Additionally, in some instances denial of signal reception to unwanted users is highly desirable both in civilian and military settings. In order to accomplish the above goals, a mixture of techniques have arisen to ensure accurate signal reception only to desired users.

Among the more prominent transmission schemes for communication systems are systems that implement spread spectrum, frequency hopping and correction code techniques. One example of a system utilizing such technologies is the Joint Tactical Information Distribution System ("JTIDS"). JTIDS is a time-division-multiple-access system that allows a very large number of designated users to communicate among themselves. A specific waveform having a specified number of pulses with each pulse having a specified number of data bits, has been developed to support JTIDS communications. Additionally, receiver architecture is somewhat standardized generally categorized by total functionality and the physical size of the unit.

JTIDS users forming a specific network each have a common code sequence that determines the pseudo-noise and frequency-hopping modulation. A JTIDS network is considered "node-less", and the loss of any one user does not result in a degradation of transmitted information by or to other users. Furthermore, users may transmit or receive information to all other users on a given network, thereby forming a virtual information "bus", with respect to the defined network. Thus, the network routinely consists of JTIDS terminals located upon platforms that are moving at very high speeds in the case of certain aircraft or missile applications, as well as stationary units, units based upon ships or hand-held.

Prior art methods of processing JTIDS signals is based upon utilizing correlators of various configuration, keyed upon certain data bits in a waveform pulse subsequent to analyzing predetermined data bit positions for the transmitted message. In this manner JTIDS network users were able to synchronize transmitted signals and utilize transmitted information. This type of processing approach is satisfactory for fixed units in a given JTIDS network, or units based on platforms that move at slow to moderate speeds.

For JTIDS units based on high speed platforms, the above described processing technique has inherent limitations. Unfortunately, the length of the individual signal pulses in conjunction with the number of bits in an individual pulse and the speed of the platform supporting the JTIDS terminal can result in loss of synchronization before the receiver reaches the end of the pulse data field. This Doppler shift of the data during intra-pulse processing renders the transmitted signal highly suspect and in some instances useless.

Accordingly, a new method of processing communication systems signals of a given format that accommodates intra-pulse Doppler shift of data is highly desired.

SUMMARY OF THE INVENTION

The present invention is a method for processing wireless data signal formats of a given configuration of N data pulses, that comprises receiving a signal, sampling a given portion of the received signal to establish a high confidence in the accurate processing of the remainder of the signal and utilizing a given group of M data pulses to determine the rate of intra-data Doppler shift, where M is defined as less than all the data pulses. The rate of the intra-data Doppler shift is used to provide a correction factor for the remaining pulses containing the transmitted message.

In one embodiment of the present invention a JTIDS waveform of two hundred and fifty eight pulses is utilized. The pulses are divided into three groups, a preamble group, a time refinement group, and a data group. The burst of two hundred and fifty eight pulses may also be spaced by guard time to ensure accuracy in the communication system. A JTIDS receiver of any given class operating on an assigned network receives an individual burst of two hundred and fifty eight pulses. The preamble section consists of the first thirty-two pulses and are read by the correlator of the JTIDS receiver. The next eight pulse positions comprise the time refinement section. Since the size of the time refinement section is known and the rate of data pulse arrival is constant or nearly constant, the time refinement section is utilized to determine the rate of intra-burst Doppler time shift. The time shift rate is determined by over-sampling the individual time refinement section pulses in order to determine an early-prompt-late relationship. After all eight time refinement pulses have been evaluated a correction factor based upon the mid-point of each time refinement pulse would serve as the basis for a drift correction factor to be applied to subsequent intra-burst data pulses.

It is an object of the present invention to provide a data communication system that has increased accuracy of transmitted messages than prior art communication systems.

It is an additional object of the present invention to provide a data communication system that has increased performance of transmitted messages than prior art communication systems while retaining the general architecture of the prior art systems.

It is a feature of the present invention to utilize a method of processing transmitted messages in which a portion of the message serves as the basis for determining a time shift correction factor.

It is a additional feature of the present invention to determine a time shift correction factor by calculating a relative data arrival rate and contrasting deviations in subsequent sampled pulses to the expected timing values.

It is an advantage of the present invention that wireless communication system messages subject to Doppler time shift corruption can be accurately processed with no or minimal message corruption.

It is an additional advantage of the present invention that wireless communication system messages subject to Doppler time shift corruption can be accurately processed with minimal changes to current receiver architecture.

These and other objects, features and advantages are disclosed and claimed in the specification, figures, and claims of the present application.

DETAILED DESCRIPTION OF THE PREFERRED EMBODIMENTS

Figure 1:
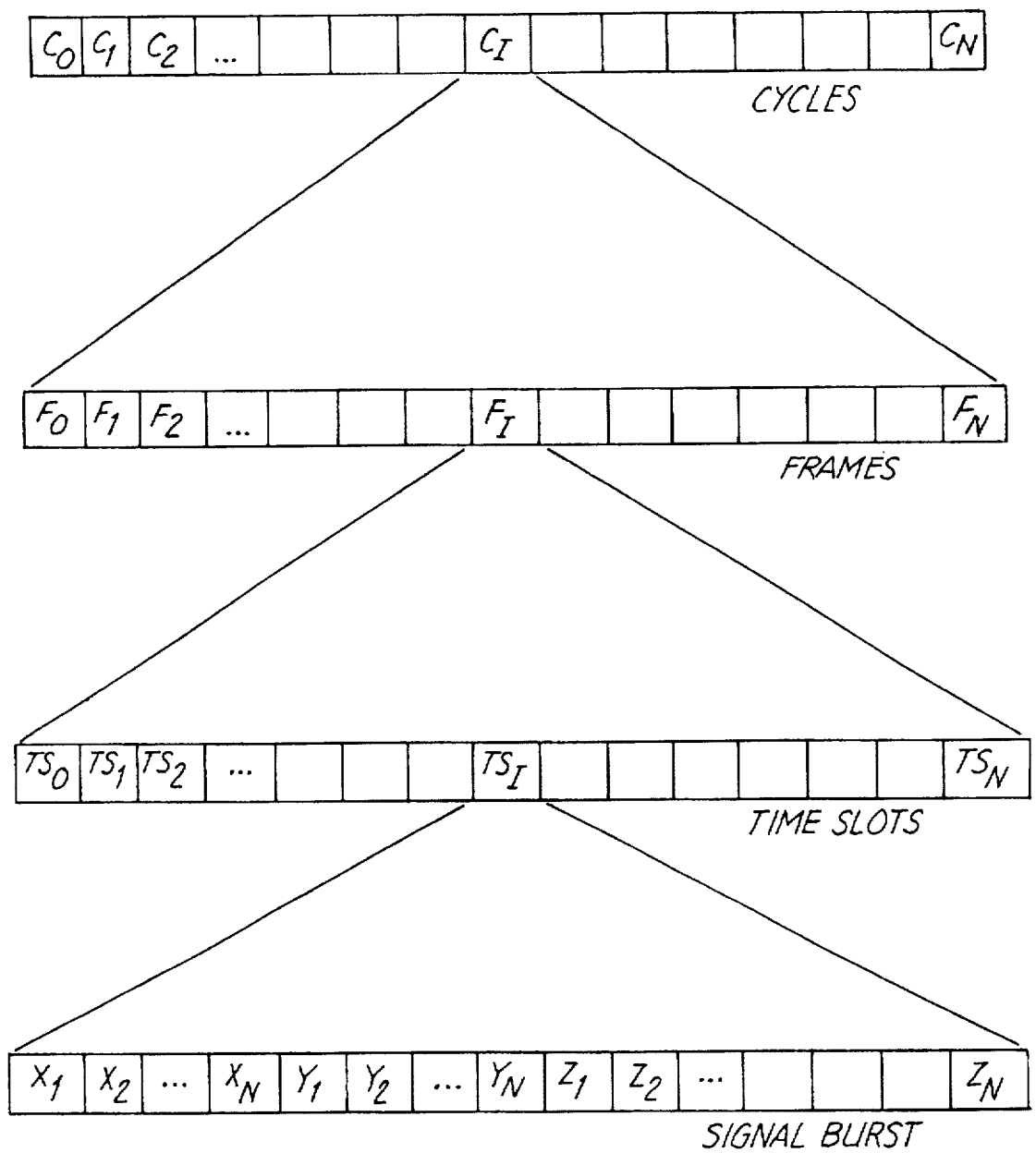
FIG. 1 illustrates a time division allocation scheme of a typical JTIDS network, as known in the prior art.

Referring now to the drawings, wherein like items are referenced as such throughout, FIG. 1 illustrates a multiple layer time division allocation scheme commonly utilized in TDMA based communication systems such as JTIDS. A given period of time, such as one day is divided into a fixed number of cycles or epochs represented by the top row of blocks $C_0$ through $C_N$. In a phase one JTIDS message the number of cycles equals one hundred and twelve of equal time duration in any given twenty-four hour period. An individual cycle $C_I$ is further divided into an equal number of frames depicted in FIG. 1 as blocks $F_0$ through $F_N$. In the example JTIDS waveform $F_I$ is twelve seconds in length, is uniform in duration to all other frames and is divided into an equal number of time slots $TS_0$ through $TS_N$. The time slots represent the individual signal burst in the communication system and contain numerous pulses or packets of information including timing, synchronization and the transmitted message. The various pulse groups are represented by the block portions X, Y, and Z which correspond to a preamble section, a time refinement section, and a message section for JTIDS waveforms. It is understood that the above described group of three signal block portions are somewhat arbitrary and could also include such additional portions as propagation or guard time blocks. Furthermore, it is specifically understood that the advantages described in the present application are not limited in scope to JTIDS waveforms, but are equally advantageous to any waveform having a similar overall configuration.

Figure 2:
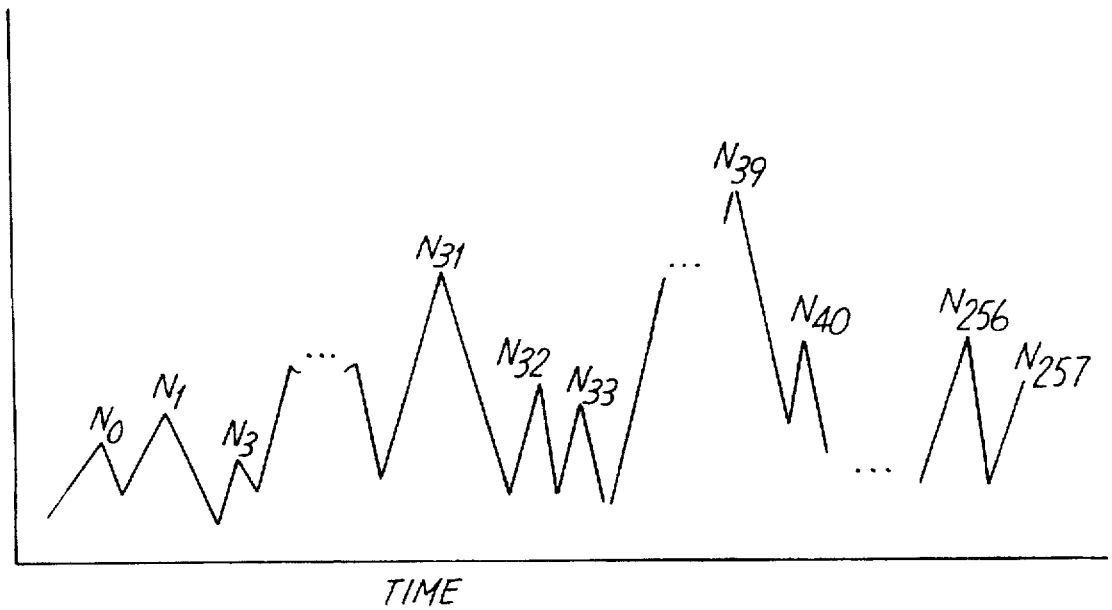
FIG. 2 illustrates a two dimensional graph of portions of an exemplar JTIDS message burst, as known in the prior art.

FIG. 2 illustrates a two dimensional graph of portions of an exemplar JTIDS signal burst, as known in the prior art. For the example depicted a JTIDS waveform of two-hundred and fifty eight pulses is shown, although pulse waveforms of seventy-two, or four-hundred and forty four pulses could also be utilized, in addition to alternative waveforms. As shown the preamble section, corresponding to the X waveform pulses of FIG. 1, are represented by pulses $N_0$ through $N_{31}$. The time refinement section, corresponding to the Y waveform pulses of FIG. 1, are represented by pulses $N_{32}$ through $N_{39}$. Finally, the message pulses, corresponding to the Z waveform pulses of FIG. 1, are represented by pulses $N_{39}$ through $N_{257}$.

Figure 3:
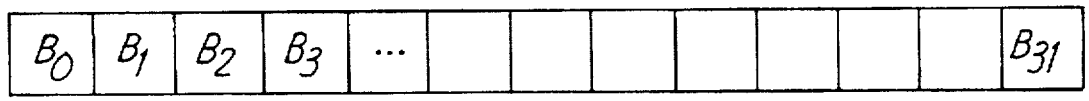
FIG. 3 illustrates data bit position in serial format for a typical JTIDS chip, as known in the prior art.

FIG. 3 illustrates the number and position of thirty-two bits referred to as "chips", as typically utilized in a JTIDS waveform. Bit positions $B_0$ through $B_{31}$ may be comprised of any combination of data, such as a one or a zero, thereby conveying a relatively small portion of an encoded signal. Each of the thirty-two bits are referred to as a "chip" since they represent only pieces or subparts of a larger information data bit.

Figure 4:
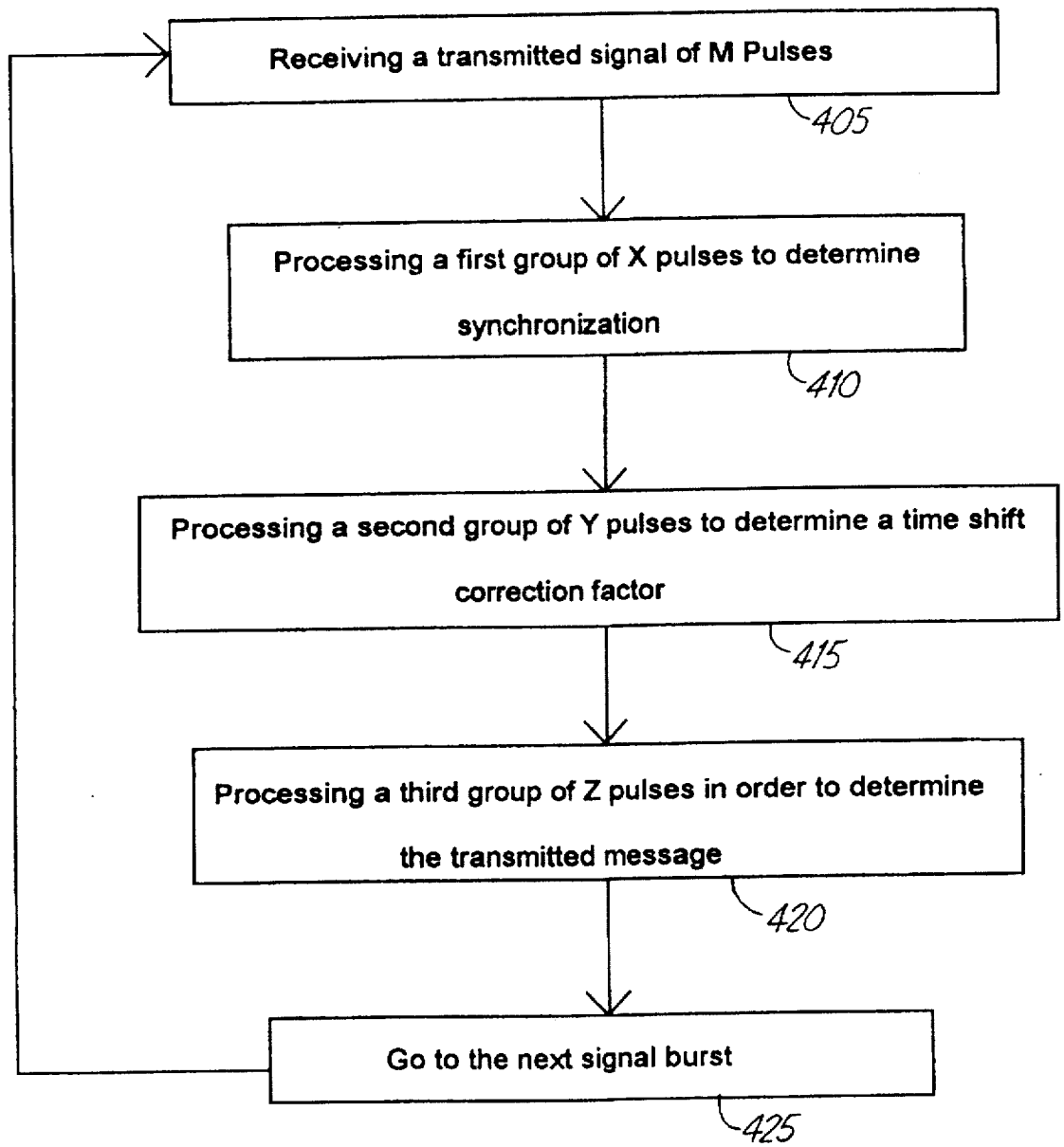
FIG. 4 illustrates a flow chart of one embodiment of the signal processing technique of the current invention that minimizes intra-burst data Doppler shift.

FIG. 4 depicts one embodiment of the repetitive signal processing technique of the present invention. A transmitted signal of M pulses is captured by an individual receiver, step 405. A predetermined number of X pulses of the M pulse signal, where X and M are integers and M is at least equal to X plus two, are processed in order to determine proper correlation of the entire pulse signal, step 410. Upon completion of the signal synchronization step, a second group of pulses, Y are sampled in order to determine a time-shift correction factor to be applied to the subsequent processing of additional pulses in signal burst consisting of M pulses, step 415. As with X, Y is an integer having a value no greater than M minus two. Upon determination of a time-shift correction factor a third group of pulses, Z are processed in accordance with the time-shift correction factor in order to prevent or minimize data "shifting" in the period of time elapsing from processing the first pulse to the last pulse of the group of pulses defined by Z, step 420. Finally, the next group of M pulses are read and the entire process repeats, step 425.

Application of the above described process with respect to the JTIDS waveform provides a user the opportunity to correct for inaccuracies in late-read pulses within a given signal burst, due to time shifting associated with the relative speed of movement of the JTIDS receiver. The preamble section of a given JTIDS waveform, consists of the first thirty-two pulses (for a two-hundred and fifty eight waveform configuration) and principally serves as a synchronization function. Immediately following the preamble section, is the time refinement section, consisting of the next eight pulses. The time refinement section provides no improvement over the preamble with respect to synchronization of the signal. Since the rate of data arrival is known and constant, or near constant, the time refinement pulses may be utilized to determine the rate of time shift thereby yielding a correction factor to maintain the "blind" data sampling in the middle of the correct chip synchronization.

Figure 5:
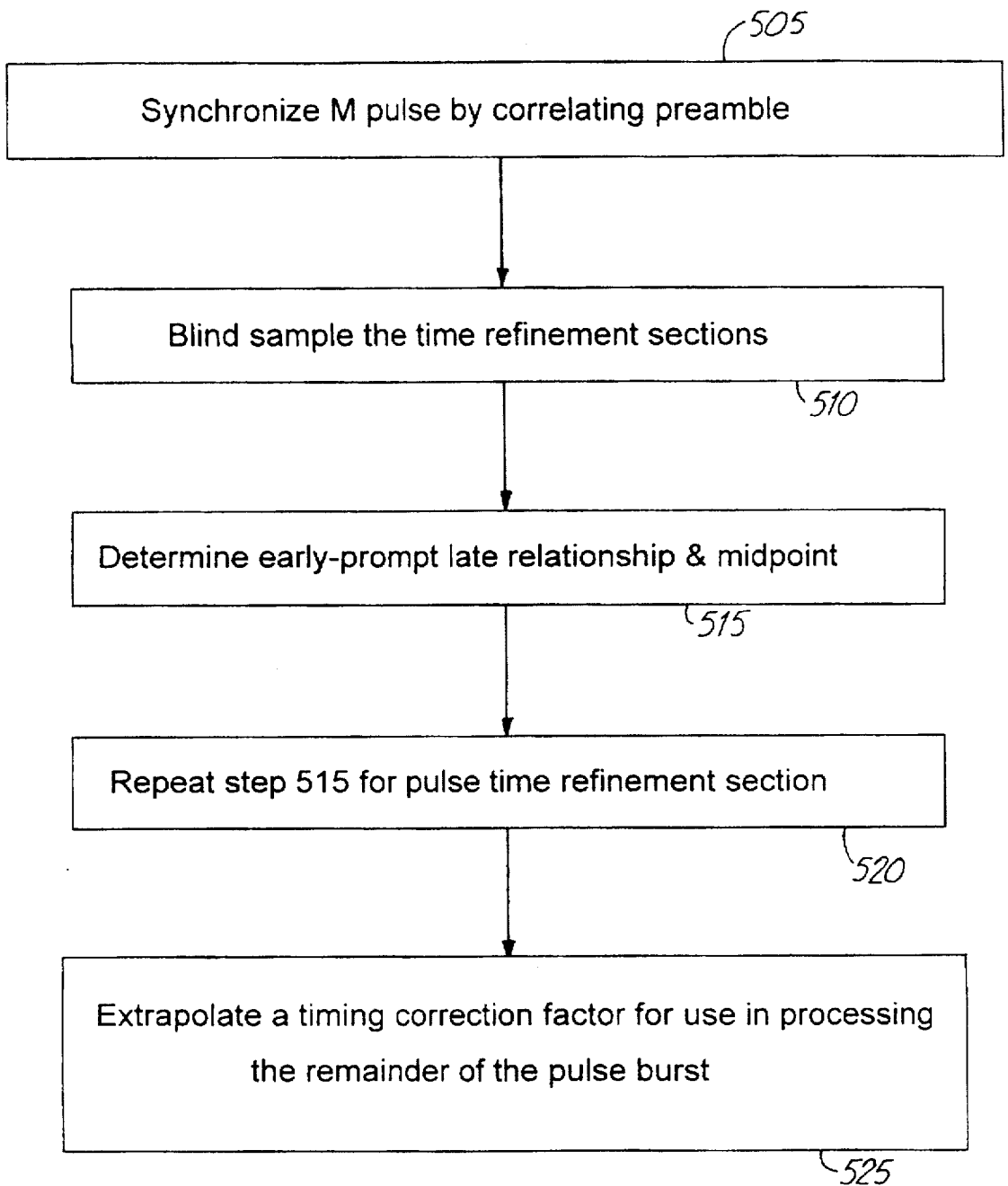
FIG. 5 illustrates a flow-chart detailing the time-shift correction determination step of FIG. 4.

FIG. 5 illustrates the steps of determining the correction factor utilized in the method of FIG. 4. In step 505 the M pulse is synchronized as determined by correlating the information in the preamble section. Blind sampling, sampling done having the synchronization dependent upon the previously determined value derived from the preamble section is then performed on the time refinement section pulses, step 510. The blind sampling of three sample chips provides the relative amplitude value for an early-prompt-late relationship for the respective data and provides a pulse "mid-point", step 515. This process is repeated for each of the eight pulses comprising the time refinement section, step 520. Next, the eight mid-point calculations are used to extrapolate a timing correction factor to be utilized in the processing of the remaining pulses in the M signal pulse burst, step 525. In this manner, a derived correction factor is applied to the blind data sampling of the message pulses of the M signal burst, ensuring utilization of the correct chip time, when processing the message portion of the M signal.

It should also be noted that step 525 could be modified to apply a weighted value to each of the time refinement pulses so as to account for the inherent shifting in time with respect to the actual order of sampling of each time refinement section pulse. Other alternative schemes, such as utilizing only every other pulse or the noncoherent combination of multiple pulses for processing gain in the time refinement section, or the first and last pulse with weighted values are also disclosed and understood to be equally included within the scope of this disclosure.

While particular embodiments of the present invention have been shown and described, it should be clear that changes and modifications may be made to such embodiments without departing from the true scope and spirit of the invention. It is intended that the appended claims cover all such changes and modifications.

I claim:

1. A method of processing data signals in a wireless communication system having bursts of individual data pulses comprising the transmitted signal, comprising the steps of:

receiving a transmitted signal of M pulses, wherein each pulse is comprised of N bits;

processing a first group of pulses, X, of the received transmitted signal, wherein X is an integer value no greater than M minus three, in order to synchronize the received signal with a predetermined decoding scheme;

processing a second group of pulses, Y, of the received transmitted signal, wherein Y is an integer value no greater than M minus X minus one in value, in order to determine a time shift correction factor of the transmitted signal; and applying the time shift correction factor in processing a third group of pulses, Z, of the received transmitted signal, wherein Z equals M minus the sum of X plus Y, and yields the transmitted message corrected for Doppler shift within the M pulses of the signal.

2. The method of claim 1, wherein the transmitted signal of M pulses is a Joint Tactical Information Distribution Systems waveform.

3. The method of claim 2, wherein the first group of X pulses corresponds to a preamble section of the waveform.

4. The method of claim 2, wherein the second group of pulses, Y, corresponds to a time refinement section of the waveform.

5. The method of claim 2, wherein the third group of pulses, Z, corresponds to a data section of the waveform.

6. The method of claim 1, wherein the step of processing the group of Y pulses in order to determine a time shift correction factor comprises the following steps:

determining an early-prompt-late time relationship of the Y pulses and a midpoint value used to extrapolate a time correction factor using selected samples of Y pulses; and utilizing the time shift correction factor obtained by the early-prompt-late time relationship while sampling the pulses in the data section to adjust for any data shifting.

7. The method of claim 6, further including sampling each of the Y pulses and averaging the deviation from the early-prompt-late relationship to determine a time correction factor to be used in the subsequent sampling of the data section pulses.

8. A method of processing data signals in a wireless communication system having bursts of individual data pulses comprising the transmitted signal, comprising the steps of:

receiving a transmitted signal of M pulses, wherein each pulse is comprised of N bits;

processing a first group of pulses, X, of the received transmitted signal, wherein X is an integer value no greater than M minus three, in order to synchronize the received signal with a predetermined decoding scheme;

processing a second group of pulses, Y, of the received transmitted signal in a predetermined sequential order of arrival, wherein Y is an integer value no greater than M minus Y minus one in value, in order to determine a weighted time shift correction factor of the transmitted signal; and applying the weighted time shift correction factor in processing a third group of pulses, Z, of the received transmitted signal, wherein Z equals M minus the sum of X plus Y, and yields the transmitted message corrected for Doppler shift within the M pulses of the signal.

9. The method of claim 8, wherein the transmitted signal of M pulses is a Joint Tactical Information Distribution Systems waveform of two hundred and fifty eight pulses.

10. The method of claim 9, wherein the first group of X pulses corresponds to a preamble section of the waveform.

11. The method of claim 9, wherein the second group of pulses, Y, corresponds to a time refinement section of the waveform.

12. The method of claim 9, wherein the third group of pulses, Z, corresponds to a data section of the waveform.

13. The method of claim 8, wherein the step of processing the second group of Y pulses in order to determine a weighted time shift correction factor comprises the following steps:

determining an early-prompt-late time relationship of the Y pulses by contrasting a Y pulse signal amplitude to the known time difference between it and the last preamble section pulse amplitude measured; and utilizing the time correction factor obtained by the early-prompt-late time relationship while sampling the pulses in the data section to adjust for any data shifting; and applying a weighting factor to each sampled pulse of the Y pulses, reflective of the time of processing of the pulse in order to arrive at a weighted time correction value.

14. The method of claim 13, further including sampling every other Y pulse and averaging the deviation from the early-prompt-late relationship to determine a time correction factor to be used in the subsequent sampling of the data section pulses.

15. The method of claim 8, wherein the transmitted signal of M pulses is a Joint Tactical Information Distribution Systems waveform of four hundred and forty four pulses.

16. The method of claim 15, wherein the first group of X pulses corresponds to the preamble section of the waveform.

17. The method of claim 15, wherein the second group of pulses, Y, corresponds to the time refinement section of the waveform.

18. The method of claim 15, wherein the third group of pulses, Z, corresponds to the data section of the waveform.

* * * * *